United States Patent [19]

Pons et al.

[11] 4,101,490

[45] Jul. 18, 1978

[54] PROCESS FOR PREPARING AQUEOUS EMULSIONS OF ADDITION POLYMERS WITH BUILT-IN EMULSIFIER

[75] Inventors: Dick A. Pons, Maassluis; Anno Bijker, Spijkenisse, both of Netherlands

[73] Assignee: Synres International B.V., Hoek van Holland, Netherlands

[21] Appl. No.: 725,119

[22] Filed: Sep. 20, 1976

[30] Foreign Application Priority Data

Sep. 25, 1975 [NL] Netherlands ............... 7511275

[51] Int. Cl.$^2$ .............................. C08L 33/08
[52] U.S. Cl. .................. 260/29.6 MP; 260/45.7 S
[58] Field of Search ............ 260/29.6 MP, 45.7 S

[56] References Cited

U.S. PATENT DOCUMENTS 3,575,944  4/1971  Stroh ............... 260/29.6 MP
3,634,353  1/1972  Strolle ............. 260/29.6 MP Primary Examiner—M. J. Welsh
Attorney, Agent, or Firm—Cushman, Darby & Cushman

[57] ABSTRACT

An emulsifier of the formula (RO)(TO)PO(OH) where RO is an alkoxy of an unsaturated polymerizable alcohol or is ABO alkoxy wherein A is a carboxylate of 3–25 carbon atoms and B is a dialkoxy group of a diol, wherein TO is an alkoxy of a branched or unbranched aliphatic alcohol, of polyoxyalkylated alkyl phenols, of addition products of ethylene oxide and aliphatic alcohols or of addition products of alkalene oxides and aliphatic alcohols, for emulsion polymerizations of addition polymers.

9 Claims, No Drawings

PROCESS FOR PREPARING AQUEOUS EMULSIONS OF ADDITION POLYMERS WITH BUILT-IN EMULSIFIER

BACKGROUND OF THE INVENTION

The invention relates to the preparation of ethylenically unsaturated emulsifiers, and also to the use of these emulsifiers in the preparation of emulsions of vinyl polymers in an aqueous phase.

Olefinically unsaturated monomers in aqueous dispersion can be polymerized to form emulsions of an addition polymer or copolymer. Emulsions of this type are often used in the preparation of paints and lacquers. The emulsions can be obtained by polymerizing one or more monomers in an aqueous phase in the presence of a suitable catalyst system and in the presence of necessary emulsifiers, stabilizers and/or protective colloids and other additives.

The emulsifiers are required to disperse the monomers in the water and to keep the resulting polymer particles in the emulsified state. In most cases, emulsifiers are employed that cannot copolymerize with the monomers used. It has been proposed to use emulsifiers containing ethylenically unsaturated groups, so that they can be incorporated into the polymer. These emulsifiers possess a sulphonic-acid group or a sulphonate group, as a hydrophilic group. See U.S. Pat. No. 3,392,147 in this regard. The disadvantage of these emulsifiers is their limited hydrolysis-stability. Certain of these emulsifiers are, furthermore, characterized by a low polymerization rate. Moreover, these emulsifiers give rise to yellowing of the coatings obtained by using the aforementioned emulsifier-modified polymers.

SUMMARY OF THE INVENTION

According to the invention, aqueous emulsions of addition polymers are obtained by an improved process of polymerizing one or more olefinically unsaturated monomers in water in the presence of one or more emulsifiers and other additives. The improvement is in using, as an emulsifier, a compound of the formula (RO)(TO)PO(OH), where RO denotes an alkoxy radical derived fron an olefinically unsaturated polymerizable alcohol of 2-12 carbon atoms or an ABO group, where A stands for a carboxylate radical derived from an unsaturated polymerizable carboxylic acid of 3-25 carbon atoms and B stands for a divalent radical derived from a diol, and where TO denotes an alkoxy radical derived from a branched or unbranched aliphatic alcohol of 6-22 carbon atoms or from a polyoxyalkylated alkyl phenol of 7-30 carbon atoms or from an addition product of ethylene oxide and an alcohol of 6-22 carbon atoms or from an addition product of an alkene oxide of at least 3 carbon atoms and an alcohol of 1-15 carbon atoms, or from an ethylene oxide/propylene oxide block copolymer mono-etherified with a $C_1$-$C_{15}$ hydrocarbon radical.

DESCRIPTION OF THE INVENTION

According to the invention, stable emulsions can be obtained which can readily be mixed with pigments and processed into stable paints. The emulsions have a low tendency to foam and can be applied as coatings with improved mechanical properties, especially an increased resistance to scrubbing.

The copolymerizable emulsifiers may be prepared in various ways. Phosphorus oxychloride can be reacted with the ROH and TOH hydroxyl compounds. It is also possible to react the TOH compound with an approximately equimolar amount of phosphorus pentoxide and then to esterify the ROH compound with the reaction product. Alternatively, the ROH compound can first be reacted with phosphorus pentoxide or polyphosphoric acid, as described in U.S. Pat. No. 3,574,794 and 3,855,364 (both of which are incorporated herein by reference), and then the resulting reaction product can be reacted with the TOH compound. However, the disadvantage of using phosphorus oxychloride or polyphosphoric acid as an esterifying agent is that hydrochloric acid or phosphoric acid are formed as a by-product. The emulsifier is preferably prepared by first reacting phosphorus pentoxide with 1 to 3, more preferably 1.5 to 2, moles of the ROH compound at a temperature of below 45° C., optionally in the presence of a polymerization inhibitor. The resulting reaction product is then reacted at a temperature of between 20° C. and about 80° C. with 0.75 to 1.5, more preferably about 1, mole of TOH compound per mole of the original starting phosphorus pentoxide, optionally in the presence of a polymerization inhibitor. If so desired, the preparation may be carried out in an inert solvent or dispersing agent.

A mixture of compounds is thus obtained which contains the (TO)(RO)PO(OH) emulsifier, and some $(RO)_1PO(OH)_2$, $(RO)_2PO(OH)_1$ and $(TO)_2PO(OH)_1$, as well as traces of phosphoric acid and triphosphate esters. Purification of the copolymerizable emulsifier is not necessary. The $(RO)_nPO(OH)_{3-n}$ compounds, where $n = 1$ or 2, are copolymerizable emulsion stabilizers of which the di-ester also shows some cross-linking action. The $(TO)_2PO(OH)_1$ is a non-copolymerizable emulsifier. The mixture of the above compounds can thus be used successfully as such in the emulsion polymerization of unsaturated compounds.

The hydrophilic function of the emulsifier is based on the presence of the acid phosphate group.

The hydrophobic function of the emulsifier is based on the presence of the TO radical. This radical may have been derived from an aliphatic mono-alcohol of 6–22 carbon atoms, such as hexanol, n-octanol, capryl alcohol, lauryl alcohol, cetyl alcohol, isotridecyl alcohol, or octadecyl alcohol. The TO radical may also have been derived from a polyoxyalkylated alkyl phenol of 7-30 carbon atoms, or from a polyoxyalkylated higher alcohol of 6–22 carbon atoms. Some examples are the condensation products of 1–40 moles of ethylene oxide and 1 mole of nonyl phenol, dibutyl phenol, dodecyl phenol or dioctyl phenol, or lauryl alcohol, n-octanol or tridecyl alcohol. Furthermore, the TO radical may also have been derived from a mono-ether of a block copolymer of ethylene oxide and propylene oxide which has been etherified with a hydrocarbon radical of 1-15 carbon atoms, or from a mono-etherified polypropylene glycol or other polyoxyalkylene glycol in which the oxy-alkylene units contain at least 3 carbon atoms, e.g., mono-methoxyheptapropylene glycol.

Preferably, TO is an alkoxy of said higher aliphatic alcohol of said polyethylene-oxide addition product of an alcohol or alkyl phenol.

The RO group may be an alkoxy group of a $C_2$-$C_{12}$ polymerizable unsaturated alcohol, such as allyl alcohol, crotonyl alcohol, cinnamyl alcohol, undecylene alcohol or vinyl alcohol. The vinyl phosphate esters are not prepared by direct esterification of phosphorus pentoxide. However, the RO group is preferably an alkoxy of a hydroxyalkyl ester or polyoxyalkylene ester of a polymerizable unsaturated carboxylic acid, corresponding to the formula A—B—OH. Here A is a carboxylate group derived from an unsaturated polymerizable carboxylic acid of 3–25 carbon atoms, such as acrylic acid, methacrylic acid or crotonic acid, or a monoester of maleic acid, fumaric acid or itaconic acid with an aliphatic alcohol containing 1–20 carbon atoms, such as methanol, ethanol, butanol, or hexanol.

B is the formula A—B—OH is a divalent radical derived from a diol. The diol may be branched or unbranched aliphatic or cycloaliphatic diol of 2–20 carbon atoms or a polyoxyalkylene diol with 2–100, preferably 2–10, units derived from ethylene glycol, propylene glycol, 1,2-butylene glycol or 1,4-butylene glycol. The diol may also contain aromatic groups or it may be a hydroxyl-terminated polylactone with a molecular weight of between 200 and 1000. The diol may be, e.g., ethylene glycol, propane diol-1,2, propane diol-1,3, butane diol-1,4, butane diol-1,2, decane diol-1,2, dodecane diol-1,2, hexane diol-1,6, 1,4-bis (hydroxymethyl) cyclohexane, 1,4-bis(hydroxymethyl) benzene, hexane diol-1,2, diethylene glycol, triethylene glycol, dipropylene glycol, tetrapropylene glycol, dibutylene glycol, a higher polyoxyalkylene glycol or polycaprolactone diol. Preferably, the emulsifiers are of the formula (RO)(TO)PO(OH), where R-O has been derived from a hydroxylalkyl ester of acrylic acid, methacrylic acid or crotonic acid in which the branched or unbranched alkyl group has 2–6 carbon atoms, in the form of a reaction product as described above.

The use of mixtures of the emulsifier with the other phosphate esters present in such a reaction product, such as phosphate esters with formulae $(RO)_2PO(OH)$ and $(RO)PO(OH)_2$, further increases the stability of the emulsion. Use of such mixtures furthermore results in cross-linking and setting owing to epoxy groups of hydroxyl groups takes place more rapidly.

Copolymerizable emulsifiers obtained according to the invention, that is, emulsifiers capable of copolymerizing with polymerizable vinyl monomers in emulsion polymerization are used in carrying out emulsion polymerizations of vinyl monomers. Emulsion polymerizations are conventional.

If these emulsifiers are used only for their emulsifying function, the emulsifier according to the invention is generally used in an amount of between 0.1 and 10% by weight, more preferably between 0.5 and 5% by weight, based on the weight of vinyl monomers. If use is made of a reaction mixture containing other phosphate esters, as described above, the mixture may be used in amounts of up to 25% by weight, preferably up to 15% by weight, based on the weight of vinyl monomers.

Optionally, other well-known emulsifiers, such as non-ionic emulsifiers, e.g., nonyl phenoxypolyethylene glycol or ethylene-oxide propylene-oxide block copolymers, may be used in addition to the emulsifier according to the invention. Protective colloids may also be used.

The monomers used in the preparation of the stable emulsions according to the invention consist fully or largely of monomers that contain no other reactive groups than the ethylenically unsaturated ones.

Some examples are the alkyl acrylates, alkyl methacrylates, alkyl maleates, alkyl fumarates, vinyl esters, vinyl ethers, vinyl chloride, ethylene, butadiene, styrene, vinyl toluene, alphamethyl styrene, acrylonitrile. In most cases mixtures of these monomers are used to impart the desired properties to the resulting polymer. In many cases, use is also made of comparatively small amounts of monomers containing not only the ethylenically unsaturated groups, but also other reactive groups, such as, e.g., carboxyl groups, hydroxyl groups, amide groups or epoxy groups. Examples of such monomers are acrylic acid, methacrylic acid, fumaric acid, crotonic acid, hydroxyethyl acrylate, hydroxyethyl methacrylate, hydroxypropyl methacrylate, ethyleneglycol monoallyl ether, acrylamide, methacrylamide, glycidyl-acrylate, glycidyl methacrylate, and allylglycidyl ether.

Thus the monomers used in the emulsion polymerisation according to the invention preferably comprise at least one monomer from the group consisting of $C_1$–$C_{12}$ alkyl esters of acrylic acid and methacrylic acid, vinylesters of $C_2$–$C_{12}$ carboxylic acids, styrene, vinyltoluene, butadiene, acrylonitrile and vinylchloride, and optionally one or more monomers from the group consisting of acrylic acid, methacrylic acid, $C_2$–$C_6$ hydroxyalkylesters of acrylic acid and methacrylic acid, acrylamide, methacrylamide, glycidylacrylate and glycidylmethacrylate.

The practical aspects of emulsion polymerization and various emulsion polymerization processes have been described in a great many publications and patent specifications; for instance, see *Acrylic Resins*, Reinhold 1962, p. 112 and following pages, to Acryl and Methacryl Verbindungen, Springer Verlag 1967, pp. 217–230.

The polymerization may be effected by means of well-known initiators, which dissolve either in the aqueous phase or in the monomer or in both. Examples of suitable types of compounds are persulphates, peroxides, hydroperoxides, azo compounds and redox systems. Depending on the nature of the monomers, the desired properties of the polymer and the desired size of the polymer particles, various types of emulsifiers may be used in combination.

The polymerization may be carried out in various ways. For instance first all monomers and other components can be emulsified in water, and then the polymerization can be initiated. Another possibility is first to polymerize part of the monomers in emulsion and then to add the other monomers either separately or as a mixture. It is furthermore possible first to polymerize a monomer or a combination of monomers of a given type and then to add other monomers or combinations of monomers, so that polymer particles with a layered structure are formed. A comprehensive survey of the various methods of polymerization is given in British patent specifications Nos. 1,417,713 and 1,421,114.

Other compounds may also be present during the polymerization, e.g., chain-length regulators, in particular mercaptans. Furthermore, such substances as plasticizers, cross-linking agents, flow-improving agents, thickeners, dye-stuffs or pigments, and the like may be added after the polymerization. If so desired, the emulsion may be stabilized further by the addition of ammonia or amines.

EXAMPLE I 43.8 grams of hydroxyethyl methacrylate (96.5%), hereinafter referred to as HEMA, are first put in a flask. Then 23.5 grams of phosphorus pentoxide are added with stirring in small quantities and at such a rate that the temperature remains below 40° C. The mixture is then allowed to react at 40° C. for another 4 hours, after which it is filtered to remove any unconverted phosphorus pentoxide. Next, 32.7 grams of a mixture of C-12 and C-13 primary alcohols (Dobanol 23 sold by Shell Nederland) are added to the reaction mixture, and the mixture is allowed to react in the air at 70°-80° C. whilst being stirred, until an acid number of about 273 has been reached.

The product thus obtained is emulsifier I, a mixture of mono-HEMA, mono-Dobanol phosphate, di-HEMA phosphate, mono-HEMA phosphate and di-Dobanol phosphate with traces of phosphoric acid. The viscosity of the clear mixture if 1000 cP at 25° C.

EXAMPLE II 250 grams of deionized water, 5 grams of emulsifier I, 210 grams of methyl methacrylate, 285 grams of ethyl acrylate and 1.33 grams of sodium bicarbonate are stirred to form a so-called pre-emulsion.

280 grams of deionized water are heated to 80° C. under an inert gas in a flask provided with a stirrer and heating, after which 1.5 grams of potassium persulphate are added. Immediately afterwards the addition of the pre-emulsion is started. The pre-emulsion is added at a temperature of 80° C. in a period of 2.5 hours, after which the polymerization mixture is allowed to react further at 85° C. for one more hour. Then the emulsion is cooled. Thus, an emulsion with a solid content of about 50% is obtained which foams very little. The coagulate content is very low. The pH of the emulsion is 4.2 and the viscosity of 60 cP (Haake viscosimeter, measuring cell E30, at 25° C. and 187.5 rpm). The mechanical stability of the emulsion is excellent, after the pH has been adjusted to about 7.5 by means of ammonia.

EXAMPLE III 13 kg of hydroxy-ethyl methacrylate are made to react with 7 kg of phosphorus pentoxide in the way described in Example I.

Next, 2150 grams of the resulting reaction product are made to react, at a temperature of 80° C. with 3394 grams of an addition product of ethylene oxide (9.5 moles) and nonyl phenol (commercial product Berol 09) in the presence of 0.32 gram of hydroquinone, until an acid number of about 159 has been reached. Thus emulsifier III is obtained, which is a clear light-yellow liquid with a viscosity of 260 cP at 25° C. and an acid number of 157.8.

EXAMPLE IV 240 grams of demineralized water, 20 grams of emulsifier III, 270 grams of ethyl acrylate, 205 grams of methyl methacrylate and 3 grams of sodium bicarbonate are stirred to form a pre-emulsion. 150 grams of demineralized water are heated to 80° C. under an inert gas in a flask provided with a stirrer and heating. 1.5 grams of potassium persulphate are then added, and immediately afterwards the addition of the pre-emulsion is started. The pre-emulsion is added at a temperature of 80° C. in a period of 2 hours, after which the mixture is allowed to react further at 85° C. for one more hour. The emulsion is cooled to below 40° C. and its pH is adjusted to 8.75 by the addition of 6 grams of 25% ammonia. The solid content is 55.2% and the viscosity is 210 cP at 25° C. (Haake, measuring cell E-30 at 187.5 rpm). The emulsion has an excellent mechanical stability and can very well be mixed with pigment and be applied in coatings.

What is claimed is:

1. A process for preparing emulsions of addition polymers in water by polymerizing one or more olefinically unsaturated monomers in aqueous emulsion in the presence of a suitable catalyst system and one or more emulsifiers and various other conventional additives, wherein the emulsifier is at least one compound of the formula (RO) (TO)PO(OH)

where RO represents the residue remaining after the removal of the hydroxyl hydrogen from an unsaturated polymerizable alcohol of 2 to 12 carbon atoms, or an ABO group, wherein A represents the residue remaining after the removal of the acid hydrogen from an olefinically-unsaturated carboxylic acid of from 3 to 25 carbon atoms, and B is a aliphatic or cyclo-aliphatic radical of from 2 to 20 carbon atoms, or a polyoxyalkylene radical of from 2 to 100 units, or an oxyalkylene polylactone radical of a molecular weight between 200 and 1000, and wherein the bonding between A and B is carbon bonded to oxygen bonded to carbon, and wherein TO is
(a) an aliphatic - oxy radical of from 6 to 22 carbon atoms or
(b) a polyoxyalkylated alkylphenoxy radical of from 7 to 30 carbon atoms containing from 1 to 40 polyoxyalkylene units, or
(c) a polyoxyalkylated higher alkoxy radical of from 6 to 22 carbon atoms and containing from 1 to 40 oxyalkylene units, or
(d) a monoalkylether of an ethylene oxide/propylene oxide block copolymer, wherein the alkyl group contains from 1 to 15 carbon atoms, or
(e) a monoalkylether of polypropylene oxide wherein the alkyl group contains from 1 to 15 carbon atoms.

2. Process according to claim 1, wherein said emulsifier is of the formula (A—B—O) (TO)PO(OH), and where A, B and TO have the meaning specified in claim 1.

3. Process according to claim 1, wherein the emulsifier is a compound of the formula (A—BO) (TO)-PO(OH), where TO has the meaning specified in claim 1, A represents the residue remaining after the removal of the acid hydrogen from a member from the group consisting of acrylic acid, methacrylic acid and crotonic acid, and B is a aliphatic radical of from 2 to 6 carbon atoms.

4. Process according to claim 1, wherein TO represents an aliphatic-oxy radical of from 6 to 22 carbon atoms or a polyoxyethylene alkyl phenoxy radical of from 7 to 30 carbon atoms and containing from 1 to 40 oxyethylene units.

5. Process according to claim 1, wherein the polymerization is effected in the presence of a mixture of phosphate esters with an emulsifying and stabilizing action obtained by reacting ROH with phosphorus pentoxide in a molar ratio of between 3:1 and 1:1 to form an intermediate reaction product and then reacting the intermediate reaction product with TOH in an amount of 0.75 to 1.5 moles of TOH per mole based on the moles of phosphorus pentoxide initially used.

6. Process according to claim 5, wherein the mixture of phosphate esters is obtained by reacting ROH with phosphorus pentoxide in a molar ratio of between 1.5:1 and 2:1 to form the intermediate reaction product and then reacting the intermediate reaction product with TOH in an amount of about 1 mole of TOH per mole of the phosphorus pentoxide initially used.

7. Aqueous emulsion of an addition polymer obtained by the process according to claim 1.

8. Process according to claim 1, wherein said emulsifier copolymerizes with said monomer.

9. Aqueous emulsion of an addition polymer obtained by the process according to claim 8.

* * * * *